June 5, 1934.  C. I. TENNEY  1,961,464
CARBURETED WATER GAS GENERATOR
Original Filed March 31, 1924   5 Sheets-Sheet 1
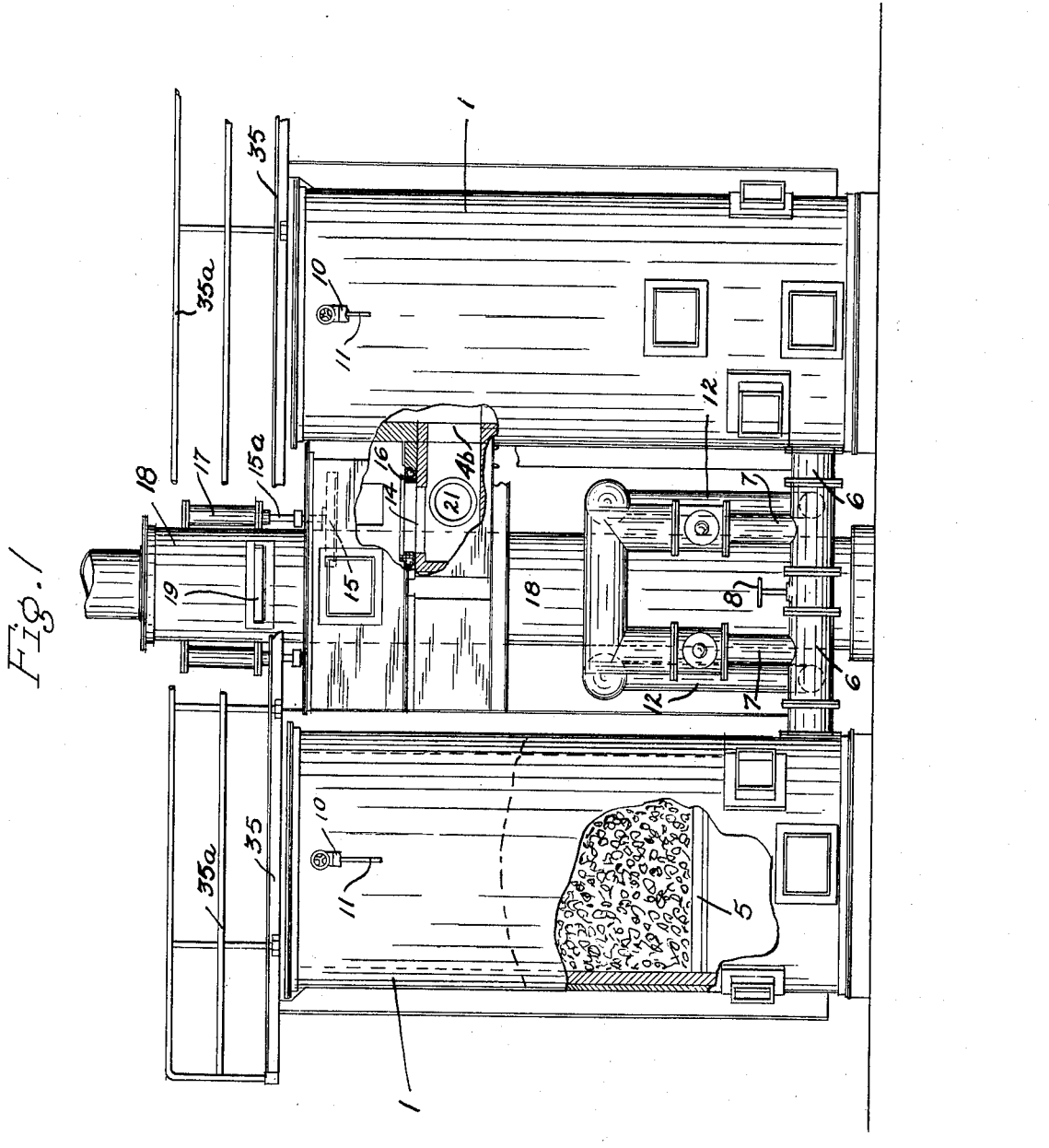
INVENTOR
CHARLES I. TENNEY
BY HIS ATTORNEY
James F. Williamson

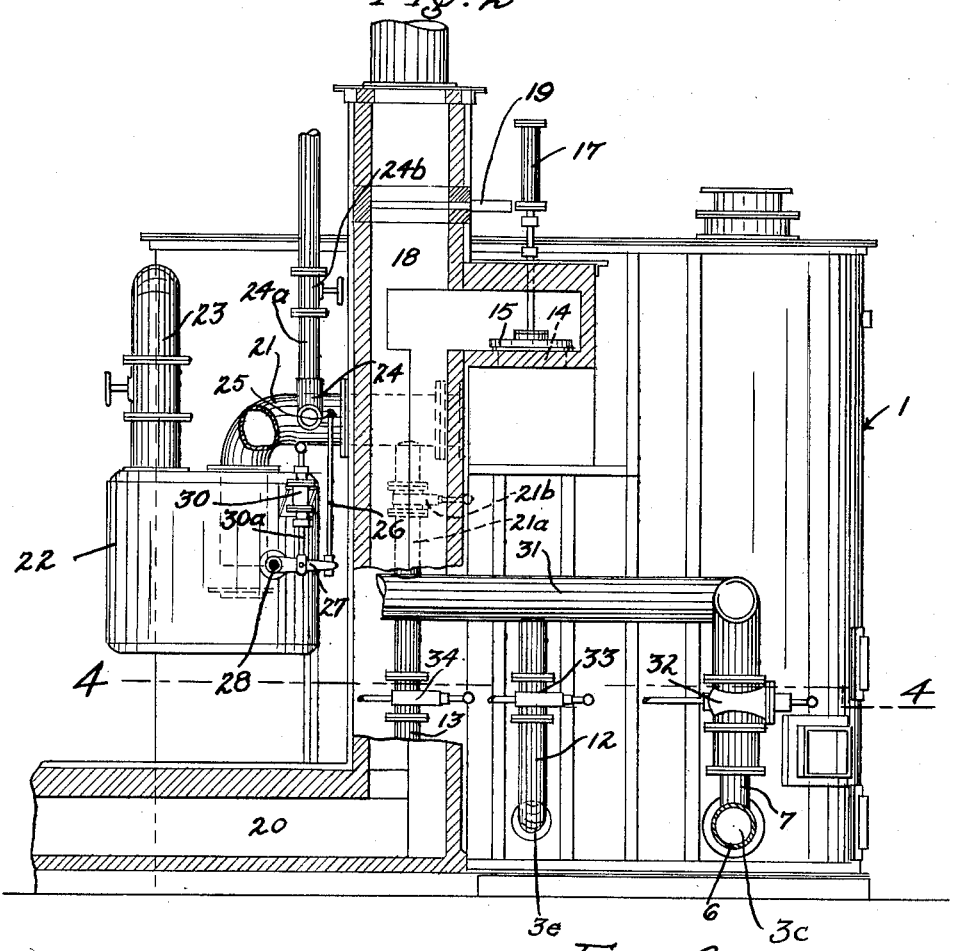
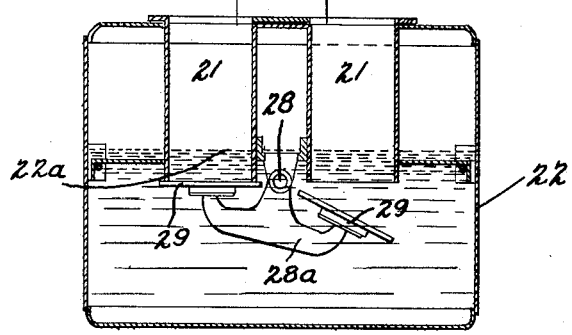

June 5, 1934.  C. I. TENNEY  1,961,464
CARBURETED WATER GAS GENERATOR
Original Filed March 31, 1924   5 Sheets-Sheet 3
Fig. 3
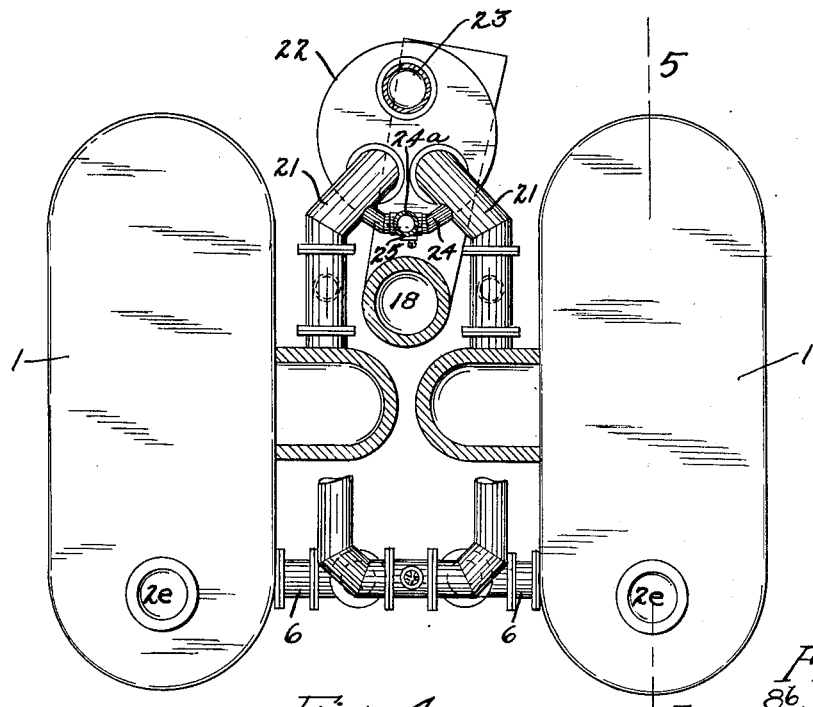
Fig. 4
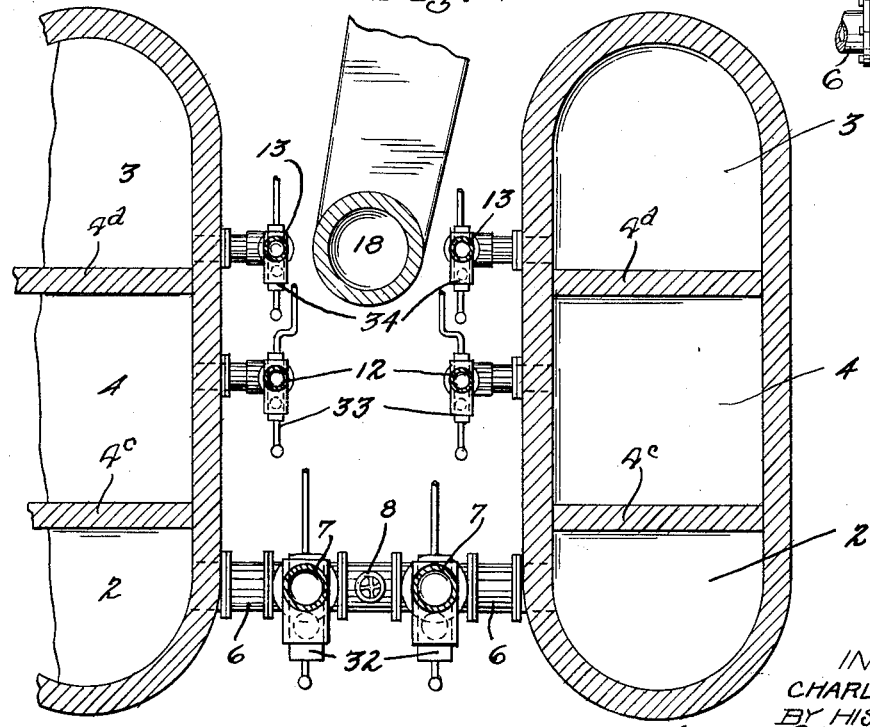
Fig. 9
INVENTOR
CHARLES I. TENNEY
BY HIS ATTORNEY
James F. Williamson

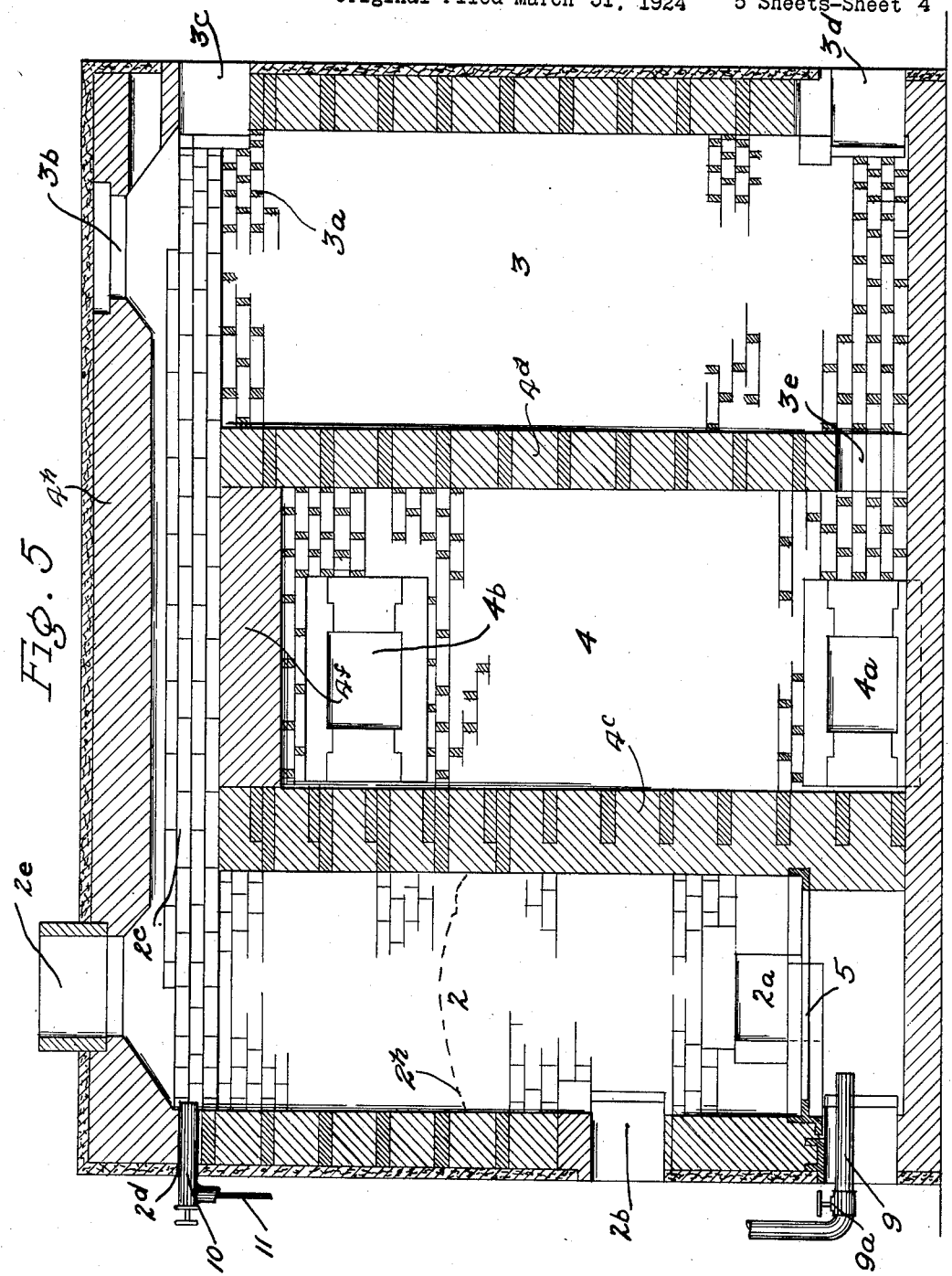

June 5, 1934.   C. I. TENNEY   1,961,464
CARBURETED WATER GAS GENERATOR
Original Filed March 31, 1924   5 Sheets-Sheet 5

INVENTOR
CHARLES I. TENNEY
BY HIS ATTORNEY
James F. Williamson

Patented June 5, 1934

1,961,464

UNITED STATES PATENT OFFICE 1,961,464

CARBURETED WATER GAS GENERATOR

Charles I. Tenney, Minneapolis, Minn.

Continuation of application Serial No. 703,266, March 31, 1924. This application January 12, 1931, Serial No. 508,330

2 Claims. (Cl. 48—80)

This invention relates to an apparatus for making gas, such as the illuminating and heating gas, particularly water gas or water gas enriched by suitable hydrocarbons. There has long been a desire to use a finely divided low grade fuel for making gas and the use of such a fuel is particularly desirable at this time, owing to the prevailing high prices of coal and coke. It is impossible in a great many modern gas generating plants to use such a finely divided low grade fuel on account of the fact that a deep bed of fuel is required in such plants and it is impossible to carry a deep bed of such fine fuel as the same becomes so massed and compacted that it is impracticable to efficiently pass air through the same.

The practice of passing steam from a discharge end of the apparatus back through the superheater, carburetor and generator used is being emphasized at the present time, but this practice has certain objections which are overcome in the present invention. It has also been the common practice in gas making apparatus to spray a liquid or solid fuel, rich in hydrocarbons, against the hot walls or hot checker-brick in the carburetors or carbureting chambers. This results in a deposit of tar and other carbonaceous materials on the walls or checker-brick which is objectionable and which results in clogging of the apparatus and which is also difficult to remove.

It is an object of this invention, therefore, to provide a gas making apparatus comprising two generators in which a comparatively shallow bed of fuel is maintained so that a finely divided, cheap and preferably bituminous coal can be used and yet a sufficient thickness of bed obtained in the two generators to accomplish all of the desired results.

It is a further object of the invention to provide a double gas generating apparatus or a tandem unit comprising two generators, two carbureting chambers and two superheating chambers, the generators, carburetors and superheaters being, respectively, connected in series and the generators also being connected.

It is also an object of the invention to provide a generator from adjacent the top of which a walled and unobstructed passage extends toward a carburetor or carbureting chamber with which the passage communicates, together with means for spraying by means of a fluid blast, preferably a steam blast, a fuel particularly liquid, rich in hydrocarbons into said passage.

It is a further object of the invention to provide such a double gas making apparatus in combination with a waste heat boiler beneath which an ignited bed of fuel is maintained and beneath which the blast gases from the gas making apparatus are also discharged to be burned.

It is a further object of the invention to provide a novel method of passing the gas through the respective zones of the apparatus and mixing therewith the desired ingredients.

These and other objects and advantages of the invention will be fully set forth in the following description made in connection with the accompanying drawings in which like reference characters refer to the same parts throughout the different views, and in which, Fig. 1 is a view in front elevation of one form of apparatus embodying the invention, certain parts thereof being shown in vertical section;

Fig. 2 is a view of said apparatus mostly in side elevation, but some parts of which are shown in vertical section;

Fig. 3 is a plan view of said apparatus, certain portions being shown in horizontal section;

Fig. 4 is a view in horizontal section taken substantially on the line 4—4 of Fig. 2;

Fig. 5 is a central vertical section taken substantially on the line 5—5 of Fig. 3 shown on an enlarged scale;

Fig. 6 is a view in vertical section of the hydraulic seal used;

Fig. 9 is a view in elevation partly in vertical section showing a modified form of valve used.

Figure 7:
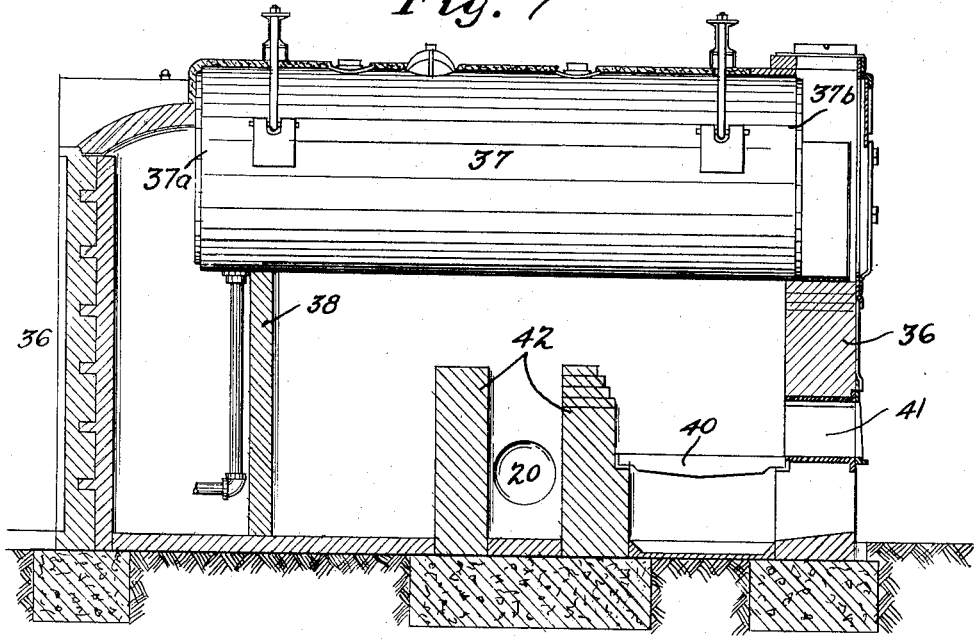
Fig. 7 is a view in vertical section of the waste heat boiler.
Figure 8:
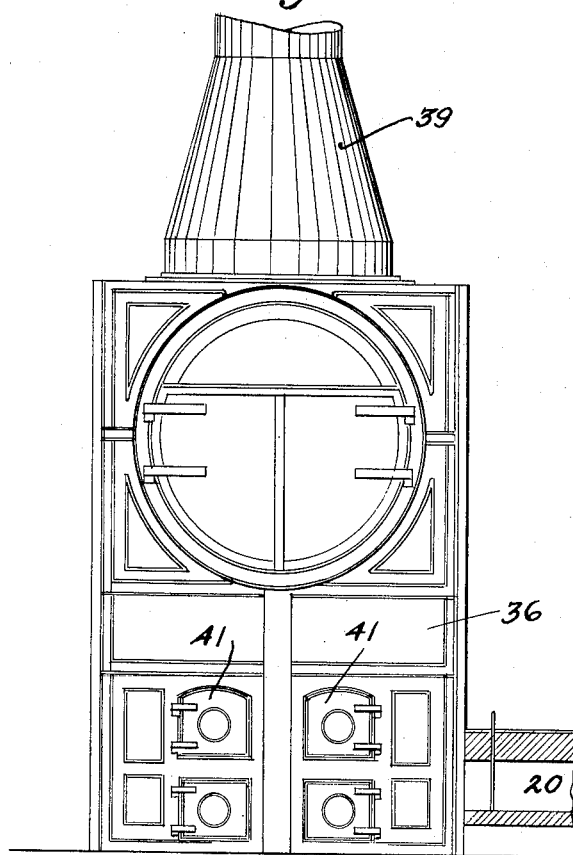
Fig. 8 is a view in front elevation of said boiler.

Referring to the drawings, the same illustrate an apparatus comprising two units 1. Each of these units comprise a single shell or casing, the walls of which are of the usual brick or fire brick construction and which casings comprise a gas generator chamber 2, a carbureting chamber 3 and a superheater chamber 4, wall 4c separating generator chamber 2 and superheater chamber 4 and wall 4d separating superheater chamber 4 and carburetor chamber 3 (see particularly Figs. 4 and 5). The generator chamber 2 is substantially of D-shape in cross section and is comparatively narrow relatively to its length. The generator chamber 2 has a fuel supporting grate 5 adjacent its bottom and an opening thereinto adjacent said grates which is connected by a conduit 6 with the opening 2a in the corresponding generator chamber in the other unit 1. The conduit 6 has a closing valve 8 adjacent its center and at each side thereof, which conduit communicates with an air supply pipe or conduit 7 which communicates with the common air supply pipe 31 later described. The generator also has disposed therein below the grates 5 a steam supply pipe 9 suitably controlled by a valve 9a. A clinker removing opening 2b is also provided in the generator 2 which may be of any usual standard construction. Adjacent the top of the generator 2 a passage 2c leads laterally therefrom, which passage is walled and unobstructed. The wall 4f forms the top of superheater 4 and, together with walls 4c and 4d, constitutes the bottom of passage 2c. The top wall 4h of passage 2c extends over chambers 2, 4 and 3 and forms the top of the generator 2 and the carburetor chamber 3. The other end of passage 2c communicates with the carbureting chamber 3 which, below said passage, is provided with the checker-brick 3a. Opposite the passage 2c is an opening 2d through the wall of generator 2 and a steam pipe 10 projects through said opening in line with said passage, said steam pipe having an oil supply pipe 11 leading thereinto. The generator 2 has an opening 2e at its top for charging or cleaning purposes and the carburetor chamber 3 also has an opening 3b at its top for cleaning or repair purposes. The carbureting chamber 3 also has openings 3c at the top and 3d at the bottom thereof and an air supply conduit 6 communicates with the latter opening. At its lower end, the carburetor chamber 3 also has a passage 3e leading into the superheater chamber 4 and the latter has an opening 4a adjacent its bottom with which communicates an air supply conduit 12. As clearly shown in Fig. 5, the superheater chamber 4 is disposed between generating chamber 2 and the carburetor chamber 3 and has a closed top beneath the passage 2c. Adjacent said top, the superheating chamber 4 has an opening 4b leading therefrom (see Figs. 1 and 5) and said opening 4b has a passage 14 leading from its upper side, which passage is controlled by a hot valve 15 comprising a rim 16 preferably formed with a sharp edge and the said valve 15 is operated by a plunger 15a carrying a piston movable in a steam cylinder 17. The generator 2, carburetor 3 and superheater 4 are thus connected in tandem or so that gas can pass successively therethrough in the order named. As shown in Fig. 2, the passage 14, beyond the valve 15, communicates with a stack 18. This stack extends upwardly to any desired height and may be closed by a slide or gate valve 19. It will also be noted that the stack 18 extends below the passage 14 and communicates with a laterally directed passage or conduit 20 to which reference will later be made. From the side of passage 14 a conduit 21 extends (see Figs. 1, 2 and 3) and this conduit leads downwardly into a hydraulic seal 22 which is disposed substantially centrally between the unit 1. It will be seen from Figs. 1, 3 and 4 that the generator, carburetor and superheater structures so far described are duplicated and a pair of said structure arranged symmetrically about a line connected to the center of stack 18 and the hydraulic seal 22. The pipes 21 therefore leading from the passages 4b both extend into the seal 22 and project a short distance below the surface of water maintained in said seal, which surface is indicated by the dotted line 22a (Fig. 6). An outlet pipe 23 extends from the seal 22, as shown in Figs. 3 and 6. A pipe or conduit 24 extends between the conduits 21, as shown in Figs. 2 and 3 and said conduit is provided adjacent its center with a three-way valve 25 adapted to be operated by a rod 26 connected thereto (see Fig. 2), the lower end of which is connected to an arm 27 pivoted to a shaft 28 carried in suitable bearings in and on the hydraulic seal 22. The pipe 24 is supplied with steam from a pipe 24a connected to a suitable steam supply such as boiler 37, the flow of steam being controlled by the valve 24b. While this latter valve may be of any suitable type, in the embodiment of the invention illustrated the same is shown as a common wheel-controlled valve. Mounted on the shaft 28 within the seal 22 is an arm 28a carrying valves 29 adapted to be brought successively against and close the lower ends of conduits 21. A steam cylinder 30 is shown mounted on the side of the seal 22 having a piston rod 30a connected to and adapted to swing the lever 27 and simultaneously operate the valves 25 and 29. The air supply pipes 7, 12 and 13 are connected to a common air supplying conduit 31 and said conduits are controlled by valves 32, 33 and 34, respectively, conduit 31 being supplied from an air pressure tank as usual. These valves may, of course, be of any desired construction, but in the embodiment of the invention illustrated, the same are shown as of sliding or gate type. A platform 35 having a railing 35a thereabout, is shown at the top of each unit 1. Air supply pipe 21a also leads from conduit 31 to conduits 21 having controlling valve 21b therein.

The conduit 20 leads to a waste heat boiler, which is supported in a suitable casing 36, said boiler being designated as 37. The boiler 37 rests upon the casing wall 36 and is suspended from a rear wall 38. While the boiler 37 may be of any suitable type, the same is illustrated as of the horizontal flue type. The products of combustion pass into the flues at the rear portion 37a thereof and out at the front portion 37b which communicates through the rear of casing 36 and openings (not shown) with a stack 39. A fuel supporting grate structure 40 is shown below the fuel charging door 41 in the rear of which are disposed the walls 42. The conduit 20 leads into the casing 36 and discharges between the walls 42.

In Fig. 9 a three-way valve is shown for the valve 8. With such a valve it will be seen that passage can be afforded as already described between the two generators 1 through the conduit 6. The valve can also be turned so that a passage will be afforded from either conduit 6 out through the gas take-off pipe 8a.

In carrying out the method of the present invention in the apparatus described, the fuel to be used will be charged into the generators 2 and ignited in the usual manner. The fuel beds in said generators will be comparatively shallow, as indicated by the dotted lines 2h. The valves 32, 33 and 34 will now be opened and air will be blown under pressure simultaneously into the generators, carburetors and superheaters, the fuel thus being brought to a high temperature. The valves 21b during this operation remain closed. The air blast gases pass from the fuel in each generator through the passage 2c leading therefrom into the carburetor 3, superheater 4 and out into the stack passage 18. These products of combustion contain some unburned gas and preferably the valve 19 is closed and the said products of combustion directed downwardly in the stack passage 18 into the conduit 20. It will be understood that at this time the hot valve 15 is open. During this operation, which is known as the "blast period", the fuel in the generators is brought to incandescence or coked and the checker brick in the chambers 3 and 4 is brought to a high temperature. The products of combustion pass to the conduit 20 and are led into the passage between the walls 42 beneath the boiler 37. A fuel bed is maintained on the grate 40 so that any combustible gases mixed with said products of combustion will be ignited and be burned by contact with the flames from the fuel on the grate, said fuel thus constituting a pilot light. The burning of these gases and the fuel, together with the heat carried in the products of combustion, will be effective to heat the boiler 37 and generate steam therein. After the blast period has been continued for a suitable period which, in practice, is usually approximately 1½ minutes, the air will be shut off by manipulation of valves 32, 33 and 34. The valve lever 28 and the valves 29 are then operated to close one of the conduits 21 in the seal 22 and open the other. Simultaneously through the rod 26 the three-way valve 25 is operated so that steam may pass through pipe 24 into the closed conduit 21 when valve 24b is opened. The hot valves 15 will then be closed and the valve 21b leading into the closed conduit 21 will be opened. As stated, the present method and apparatus are particularly designed for the use of cheap fuel such as finely divided bituminous coal. After the apparatus has been heated during the blast period some of this fuel is charged into the generators and a considerable volume of coal distillation gases and vapors will be formed or distilled off from this fuel. Air will now be turned into the conduit 21 closed by its valve 29, through its air conduit 21a. This air will pass back through the opening 4b through the hot superheater 4 upward through the carburetor 3 into the top of the generator chamber 2. This air will be highly heated and will pass with the said hydrocarbon coal distillation downwardly through the first fuel bed and through the conduit 6 to and upwardly through the fuel bed in the second generator chamber 2. The gas passing from the second fuel bed will contain carbon monoxide, hydrocarbons, some hydrogen and possibly some carbon dioxide. This gas will then pass from the second generator 2 through the second carburetor 3 and through the second superheater 4 from which it will be conveyed through the second conduit 21 to the hydraulic seal 22 and to the place of storage. After the air has thus been run through the apparatus, for a suitable period which will be quite short, usually a half minute or less than a minute, the valve 21b which has been open will be closed. Steam will now be turned into the pipe 24a by opening valve 24b, and will pass through the pipe 24 into the conduit 21 to which air has just been supplied and which is closed by its valve 29 in the seal 22. The steam thus turned into said conduit 21, passes therefrom into the passage 4b of one superheater into and downwardly through said superheater through the passage 3e at the bottom thereof and upwardly through the carbureting chamber 3. The steam is superheated as it passes through the hot checker brick in chambers 3 and 4 and then passes through the passage 2c into the generator chamber 2 and downwardly through the bed of fuel at the bottom thereof. As the steam passes through the bed of fuel it is for the greater part dissociated and gas passes from the bottom of the fuel bed through the conduit 6 beneath the grates and fuel of the other generator of the apparatus. Gas passing from beneath the bed of the first generator consists principally of hydrogen, carbon monoxide with possibly some carbon dioxide. This gas passes upwardly through the fuel bed in the second generator and the carbon dioxide therein is further reduced to carbon monoxide. As the heated carbon monoxide and hydrogen gas rises in the second generator oil is sprayed into the generator and passage 2c by means of the pipe or nozzle 2d. This oil is sprayed in by means of steam and is thus effectively volatilized or atomized. The oil thus being finely broken up mixes with the hot carbon monoxide and hydrogen and unites therewith to form the desirable hydrocarbon gases. It is desirable to have this oil sprayed into an unobstructed passage and to break the same up into fine particles so that it can commingle with the hot hydrogen and carbon monoxide while in suspension. It has heretofore been the practice to spray the oil against the checker brick in the generator or carburetor. This practice has resulted, even with very hot checker brick, in a carbonization or the formation and deposit of carbon, lamp black and tar, on the checker brick. This deposit is difficult to remove and said practice also results in the production of too large a quantity of a tar by-product. With applicant's apparatus and process the combination of the vaporized oil and the gases is practically completed before the gases enter the checker brick of the carburetor where they are fixed. The gases thus pass through the carburetor and the second superheater 4 where they are heated and fixed and then pass out into the other conduit 21 into and through the hydraulic seal 22, from whence they are taken to suitable scrubbing and storage apparatus.

After the described gas making runs with air and steam successively, another air blast period will follow and the fuel beds in both generators, as well as the carburetors and superheaters again raised to a high temperature. Hot valves 15 will now be closed as well as the air valves 32, 33 and 34. Fuel will then be charged into the generators, either one or both, but preferably both, and the valve lever 38 and valves 29 will then be operated to open the conduit 21 which was closed and close the other conduit 21. The valve 21b leading to the conduit 21 which is now closed will then be opened and an air run will be made through the apparatus in a reverse direction to the air run above described. As above described, the air will act to carry the producer gas formed from the charge of fresh fuel downwardly through the first fuel bed and upwardly through the second fuel bed and the resulting gas will be fixed by passing through the second carburetor and superheater and will pass through the seal 22 to the proper cleaning and storing apparatus. After this reverse air run has been continued for a suitable time, valve 21b which was opened will again be closed. Valve 24b will be opened and steam will be turned into the closed conduit 21 through which the air has just passed. This steam will pass back through the superheater 4, carburetor 3, down through the fuel bed in the first generator and up through the second fuel bed. The gas will then be enriched with hydrocarbons by spraying oil into passage 2c, as above described, and will then pass through carburetor 3 and superheater 4 and be fixed after which it will pass through seal 22 to suitable scrubbing and storage apparatus.

By the use of the reverse air run after the blast period, and then the subsequent reverse run of steam, the heat from the fuel is very efficiently conserved and used. By the air run the hydrocarbons from the freshly charged fuel which would otherwise pass out at the stack or to the waste heat boiler, are utilized in making gas. The air is preheated by passing through the heated generator and carburetor and reaches the fuel bed at a temperature for efficient action. The gas, including the hydrocarbons passing from the green coal fuel is conserved and used. There will be some combustion in the fuel bed and this fact, together with the fact that the air is preheated, tends to raise the temperature of the fuel bed. The preheating of the air greatly assists combustion and the formation of carbon monoxide and carbon dioxide. The temperatures of the carburetor and superheater are not sufficiently lowered to adversely affect the subsequent run of steam. The air passing back through the hot superheater and carburetor also very effectively burns off any deposits of carbon, tar or the like, on the checker brick. In fact, the passage of air is more effective in cleaning the brick than is the passage of superheated steam. Such deposits usually accumulate on the checker brick in the carburetor and superheater during the air blast period, especially where bituminous coal is used as fuel.

It will be noted that in the reverse steam run the steam first passes through the first superheater and carburetor and is raised to a high temperature. Some of the heat thus carried to the first fuel bed by the steam is imparted thereto so that the temperature of the fuel bed is not so greatly lowered by the dissociation of the steam. The heat of the carburetor and the superheater are thus utilized for maintaining the fuel bed at an efficient temperature. As above stated, the greater part of the dissociation of the steam takes place in the first fuel bed, so that the temperature of the second fuel bed is not greatly lowered by this process. At the same time, the second carburetor and superheater are maintained at a high temperature to efficiently fix the gases produced and to efficiently enrich the water gas with the hydrocarbons supplied by the oil. The advantage of the reverse passage or back run of the steam through the superheater and carburetor is thus obtained and at the same time a rich gas is produced. It has been proposed to manufacture a reverse run gas with a single superheater, carburetor and generator, but when this is done the resulting gas contains few hydrocarbons and is of low heating value. When the steam is run reversely through the superheater and carburetor in the gas making run and is superheated the steam picks up any deposited carbon, tar, or the like, which may still be in the checker-brick and carries the same back to the fuel bed in the first generator. This material, which is practically altogether carbon or hydrocarbon material, is broken up in the fuel bed and converted into carbonaceous or hydrocarbon gases and coke.

It has been found in practice that the gases passing through the fuel beds both in the blast period and in the subsequent gas making runs, tend to move close to the walls. With fuel beds of large area this will result in a core of hard material forming at the center of the bed. To overcome this in applicant's apparatus, the generators are made with a cross sectional area long and narrow. The gases are thus passed through the fuel bed substantially uniformly at all points thereof and the objectionable formation of a core at the center thereof is eliminated.

As stated, the heat of the fuel bed in the first generator is conserved by the superheated steam so that the temperature thereof is not greatly lowered by the dissociation of the steam which takes place therein and the temperature of the fuel bed in the second generator is also not greatly lowered by the completion of the dissociating process. The conservation of heat in the two fuel beds by the reverse runs of the air and steam results in a shortening of the blast period, and in a very efficient use of the fuel. Furthermore, by having the two shallow fuel beds, the combustion of the fuel during the blast period is more complete than if the deep fuel bed were used. With the deep fuel bed, more combustible gas will be driven off into the stack and more volatile hydrocarbon will be driven off while the bed is being heated, which will cause a greater deposit of tar and carbon in the checker brick. By having the two shallow fuel beds, therefore, the fuel is more efficiently used than where a single deep bed is provided.

It is sometimes desirable to operate the apparatus by blowing steam simultaneously into both generators through the steam pipes 9 below the grates of said generator. This steam passes from each generator outward through corresponding carburetor and superheater. The apparatus is not particularly designed, however, for a gas making run to be made in this manner, although this run may be made at times to expel the air and gases from the apparatus so that explosions will not occur during the blast period or to make gas in the usual way. It will also be noted that by passing the gases from one fuel bed to the other during the gas making run, the conduits connecting the generators will be heated. When the next blast occurs the air passing into these conduits will be preheated and the heat stored in the conduits thus used. This results in a further conservation of the heat.

From the above description it is seen that applicant has provided a very efficient process and apparatus for producing a high grade carbureted water gas from a low grade fuel. By having the two shallow beds of fuel the gas is effectively passed therethrough and all of the advantages of a deep fuel bed are obtained. By using the reverse runs through part of the apparatus, the heat is effectively utilized and a great saving in fuel effected. The deposits of carbon on the checker brick are very effectively removed by the reverse runs of air and steam through the superheater and carburetor and even though the reverse run process is used, all of the gas is carbureted and is of uniform quality. The gas can therefore be stored and will comprise a volume of uniform characteristics. The steam required can be efficiently produced in the waste heat boiler forming part of the apparatus and the heat and unburned gases of the blast period are efficiently used in connection with this boiler. The apparatus therefore forms a very compact and efficient unit.

If desired, the reverse air run may be omitted and the reverse run of steam performed immediately after the blast period. It may also be desirable at some times to supply the air for the reverse air and steam runs at the bottom of the carburetor chamber by manipulation of valves 34 instead of supplying the same to the superheaters, and if desired, only one set of the apparatus can be used and the gas taken off at the bottom of each generator as the reverse air or steam run is made. A three-way valve structure would then be used for valve 8. Without any change whatever in the apparatus, reverse runs can simultaneously be made in both sets of the apparatus, the gas being taken off through said three-way valve. Such a three-way valve is shown in Fig. 9. Said valve is connected at either side to conduits 6 which extend to the two generators. Said valve may be turned to position to connect conduit 6 or it may be turned to position to connect either conduit through valve passage 8b to the conduit 8a' which would extend to a suitable seal pot or other receptacle for the gas taken off.

This application is a substitute for and a continuation of applicant's co-pending application S. N. 703,266, filed March 31, 1924.

It will, of course, be understood that various changes may be made in the form, details, arrangement and proportions of the apparatus and in the sequence of steps in the method without departing from the scope of applicant's invention, which, generally stated, consists in a method and apparatus capable of carrying out the objects above set forth, such as shown and described and defined in the appended claims.

What is claimed is:

1. A carbureted water gas set having in combination, a unit comprising an enclosing wall having partitions extending thereacross forming chambers constituting respectively, a generator, a superheater, and a carburetor, arranged in the order named, means connecting the top of said generator and the top of said carburetor, the partition between the carburetor and superheater having an opening in its bottom affording communication therebetween, an air conduit, means connecting said air conduit to the bottom of said generator for supplying air thereto, means connecting said air conduit to the bottom of the carburetor for supplying air thereto, a conduit leading from the top of the superheater, a wash box with which said conduit communicates, a steam supply conduit for delivering steam into said latter conduit and back into the superheater, a conduit communicating with the bottom of said generator forming a gas offtake, a grate adjacent the bottom of said generator, and means for delivering steam to said generator below said grate.

2. A carbureted water gas set comprising a generator, a superheater and a carburetor arranged in the order named and arranged as a unit having common walls, there being a connection between the top of the generator and the top of the carburetor, and a connection between the bottom of the carburetor and the bottom of the superheater, means for supplying steam to the top of the superheater to pass downwardly through the superheater, upwardly through the carburetor and downwardly through the fuel in the generator, and combustible gas offtakes leading from said set directly from the bottom of the generator and the top of the superheater, the gas offtake from the generator being separate from and independent of the connection between the generator and carburetor, thereby allowing a free and unobstructed passage between said generator and carburetor.

CHARLES I. TENNEY.